United States Patent Office 2,740,728
Patented Apr. 3, 1956

2,740,728
PRODUCTION OF RESIN-IMPREGNATED POROUS BODIES

Lawrence F. Sonnabend and Charles R. Williams, Midland, Mich., assignors to The Dow Chemical Company, Midland, Mich., a corporation of Delaware No Drawing. Application January 25, 1954,
Serial No. 406,074

13 Claims. (Cl. 117—59)

This invention concerns an improved method of treating solid porous bodies such as wood, paper, cardboard, concrete, or bricks, etc. to form solid resinous materials within pores, or cells, of the same. It pertains especially to the impregnation of wood with liquids that undergo condensation reactions to form solid resins within the wood.

It has long been known that wood can be hardened, or otherwise improved in properties, by being impregnated with resinous materials, but the known methods for accomplishing the purpose are satisfactorily effective only in impregnating thin sheets or panels of wood, e. g. of ½ inch thickness or less. Boards, beams, or logs, can be impregnated to greater depths by known methods, but the impregnation to depths greater than ¼ inch usually occurs in a spotty, i. e. non-uniform, manner and is unsatisfactory. A general method heretofore proposed involves soaking the wood in a preformed liquid phenol-formaldehyde resin and thereafter heating to form an advanced-stage solid resin within the wood. Various modified procedures, such as those of steaming and evacuating the wood prior to impregnating it with the liquid resin, or of applying pressure during the impregnation, or during solidification of the resin by heating, have been proposed, but have not resulted in satisfactorily uniform impregnation of wood in a direction transverse to the grain to depths greater than about ¼ inch. Such known methods are not only of limited effectiveness, but are disadvantageous in that preformed liquid phenol-formaldehyde resins tend to increase in viscosity on standing and cannot satisfactorily be stored in large quantities for use in the process.

An object of this invention is to provide a method whereby porous bodies, especially of wood, may be impregnated readily and in an effectively even manner to considerable depths with a resin-forming liquid and a catalyst for resinifying the same. Another object is to provide a wood-impregnation method which results in formation of a solid resin within the wood. A further object is to provide wood impregnated with a solid, and preferably a thermosetting, resin in a manner and to an extent rendering the impregnated wood resistant to attack by aqueous solutions of acidic substances, e. g. acids and acid-acting salts such as hydrochloric acid, sulfuric acid, aluminum chloride, or ferric chloride, etc. A still further object is to provide a method for resinifying solid porous bodies which involves use of a non-resinous, resin-forming liquid impregnant that is sufficiently stable for storage prior to use in the process. Other objects will be evident from the following description of the invention.

The invention comprises steps of impregnating a solid porous material first with a normally gaseous basic nitrogen compound and thereafter with a non-resinous liquid capable of undergoing a condensation reaction to form a solid resin within the porous body. Air may first be evacuated from the solid porous material so as to facilitate the impregnations, but this is not required.

It has been found that the combination of steps just stated is advantageous in a number of respects. The initial impregnation of a solid porous body with a gaseous basic nitrogen compound apparently facilitates the subsequent impregnation with a resin-forming liquid due, presumably, to becoming dissolved by the liquid and thus drawing the liquid into the porous body. This effect is very noticeable in the treatment of wood. The basic nitrogen compound also serves as a catalyst for the resin-forming reaction. The reaction for conversion of the non-resinous liquid starting material to a solid resin is strongly exothermic. The impregnated body is usually heated to cause a fairly rapid reaction to form the resin, but the reaction may sometimes be accomplished without external heating of the body. Heat generated by initial occurrence of the reaction in externally heated outer portions of the impregnated porous body propagates occurrence of the reaction in interior portions of the body with resultant conversion of liquid throughout the porous body to a resin and curing of the resin. In other words, heat generated by the reaction supplements the heat usually applied externally and shortens the time of heating required for formation and cure of resin in interior portions of the porous body. This advantage is not obtained to as great an extent in the conventional use of a preformed liquid resin, such as a phenol-formaldehyde condensation product, as the impregnant, i. e. the heat generated by conversion of a preformed liquid resin to a solid is not as great as that generated in forming the same amount of solid resin from corresponding non-resinous liquid starting materials.

The invention can be applied to resinify solid porous materials in general. Examples of solid porous bodies that can be resinified by the method of the invention are wood, paper, cardboard, cement blocks, concrete, and porous bricks, etc. The invention pertains especially to the impregnation of wood with resin-forming liquids and formation of resinous condensation polymers inside of the wood. It permits deeper and more nearly uniform impregnation of wood than is obtained under similar conditions of time, temperature, and pressure, by dissolving ammonia or an amine in the resin-forming liquid and impregnating otherwise untreated wood with the resulting solution, or by first impregnating the wood with ammonia or an amine and thereafter with a liquid resin, e. g. a preformed liquid phenol-formaldehyde condensation product, rather than with a non-resinous, resin-forming liquid such as is required by the invention.

Any non-resinous liquid capable of undergoing a condensation reaction in the presence of a basic nitrogen compound, such as ammonia or an amine, to form a solid resin can be employed as an impregnating liquid in the process of the invention. Examples of suitable resin-forming liquids are solutions of phenol and formaldehyde, of cresol and formaldehyde, of chlorophenol and formaldehyde, of urea and formaldehyde, of furfuraldehyde and phenol, of furfuraldehyde, formaldehyde and phenol; and solutions of furfuryl alcohol, phenol and furfuraldehyde; etc. Such non-resinous, resin-forming liquids possess good stability at room temperature in the absence of catalysts. They may be stored in large quantities and be withdrawn as required for use in the process.

It is desirable that the resin-forming impregnant be a fairly thin liquid, e. g. having a viscosity of 100 centipoises or less at 25° C. Inert liquid diluents such as water, methanol or ethanol, etc., can, if desired, be used to thin the impregnating liquids in instances in which they are soluble therein. The resin-forming liquid is preferably free of condensation products thereof, although the presence of a small proportion, e. g. 10 per cent by weight or less of the same, in liquid polymer form can be tolerated. The resin-forming liquid should not be converted largely to a liquid resin before being applied to a finely porous body such as wood, since the liquid resins do not penetrate as deeply or as readily into finely porous bodies as is desired. Also, the liquid resins tend to thicken on standing. Aqueous solutions of one molecular equivalent of a phenol, preferably a monohydric phenol, and from one to three, preferably from one to two, molecular equivalents of formaldehyde, such as may be formed by admixing the phenol with an aqueous formaldehyde solution of 20 weight per cent concentration or higher, are usually employed in the present process. Such a solution does not thicken appreciably on standing for several months at room temperature.

Any normally gaseous, strongly basic nitrogen compound such as ammonia, methylamine, or dimethylamine, etc., can be used as an impregnant in the process of the invention. Because of its low cost and availability, ammonia is preferred. The gaseous basic nitrogen compound may be anhydrous or may be admixed with inert gases or vapors such as nitrogen, or water-vapor, etc. For instance, the vapors formed by boiling an aqueous ammonium hydroxide solution, or an aqueous solution of methylamine, are suitable. Substantially anhydrous gaseous ammonia is preferred.

The impregnation steps of the process may be preceded by a step of placing the solid porous body in a chamber and evacuating the latter to remove air from the body. In such instance, the gaseous basic nitrogen compound, e. g. ammonia, is preferably fed to the evacuated chamber in amount such as to develop a vapor pressure in the chamber of one atmosphere or higher, e. g. up to 100 pounds per square inch, gauge, or above. As alternative procedure, the evacuation step may be omitted and the solid porous body be impregnated directly with vapors of the basic nitrogen compound at atmospheric pressure or above, preferably at a pressure of 2 pounds per square inch gauge, or higher.

Unabsorbed vapors of the basic nitrogen compound may be removed from contact with the solid porous body prior to contacting the latter with the liquid impregnant, or may be retained until after such contact, the preferred procedure being dependent on the kind and condition of the solid porous material being treated. Porous solid materials such as concrete, or bricks, etc., which are not highly absorptive of gaseous basic nitrogen compounds are advantageously first wetted with water to render them more absorptive, and retentive, of gaseous basic nitrogen compounds and are thereafter treated in accordance with the method as hereinafter described with respect to wood. Alternatively, such porous material permeable to, but not highly absorptive of, ammonia may be impregnated directly with a gaseous basic nitrogen compound at pressures in the order of from 2 to 100 pounds per square inch, gauge, or above, and the vapor pressure be maintained or increased during the subsequent steps of introducing the resin-forming liquid and impregnating the solid porous material therewith. Unabsorbed liquid is usually drained from the impregnated solid body and is neutralized, e. g. to a pH value of from 4 to 6 or thereabout, so as to render it non-reactive during storage for further use in the process. Any acid can be used for the neutralization, but an organic carboxylic acid, such as lactic or acetic acid, is preferred. The impregnated body is usually heated at temperatures of from 50° to 150° C. or higher to cause formation of a solid resin in the same, but the resin-forming reaction may sometimes be accomplished at lower temperatures, e. g. by storage of the impregnated body for several days or longer at room temperature. The impregnated body is usually pressured with air, nitrogen, or other inert gas during occurrence of the resin-forming reaction so as to prevent bleeding of the resin-forming liquid from the porous body, but such application of pressure is not required.

Wood is highly absorptive of gaseous basic nitrogen compounds, e. g. ammonia, and tends to retain the same. It is usually impregnated with such a compound at approximately atmospheric pressure, but higher pressure, e. g. up to 100 pounds per square inch, gauge, or above, can be applied to shorten the time of impregnation, or to cause an increase in the amount of basic nitrogen compound absorbed. After completing the impregnation, unabsorbed vapors of the basic nitrogen compound are preferably removed so as to avoid premature thickening of the resin-forming liquid with which the wood is next impregnated. Subsequent steps of the process are as described above.

Although the invention is applicable, as just described, for impregnating porous solid materials in general, it is applied with particular advantage for the treatment of wood, e. g. to render it resistant to corrosive attack by acids. As is well known, certain woods are more readily impregnated than others. For instance, most hard woods such as red oak and maple can be impregnated more deeply than soft woods such as spruce or fir under otherwise similar conditions. However, certain hard woods, e. g. white oak, are highly resistant to impregnation. Heart wood is generally more difficult to impregnate than is sap wood. The ease and depth of penetration of a liquid into wood is generally greater lengthwise through the wood than in a direction transverse to the grain of the wood. Although these generalizations apply with regard to the method of the invention, the latter can be applied to obtain exceptionally deep impregnation in any direction into wood of all kinds.

The invention may be applied satisfactorily to impregnate wood, regardless of whether it be green, air-dried, or kiln-dried, and regardless of whether it has been given a conventional pre-treatment such as steaming to open the pores of the same. It is usually applied in treating lumber and timbers in the condition in which they are received from the mill.

The wood is placed in a chamber and the latter is closed. The vessel is preferably evacuated, e. g. by pumping air therefrom until the pressure inside the vessel has been reduced to 0.5 atmosphere or less. This operation has an effect of rendering the wood more receptive to impregnation with ammonia and the resin-forming liquid than when it is omitted. It is usually accomplished in satisfactory manner without heating the vessel or the wood therein, but heat can be applied to facilitate removal of moisture from the wood. The initial evacuation step is usually employed, but is not essential and can be omitted.

Ammonia gas is introduced into the chamber containing the wood. The ammonia is preferably introduced in an amount sufficient to develop a pressure of about 1 atmosphere, but it can be applied to develop a pressure as great as desired. Alternatively, the vapor pressure inside the vessel may be at, or above, atmospheric pressure when the ammonia is fed in and the ammonia can be used to flush air from the chamber. The gaseous ammonia is preferably anhydrous, but may contain water vapor, e. g. the vapor mixture obtained by boiling an aqueous ammonium hydroxide solution can be used. The wood is retained in contact with the ammonia until impregnated therewith. When employing gaseous ammonia under the above-stated preferred conditions, thorough impregnation of wooden boards or planks of 4 inches thickness or less can usually be accomplished in 20 minutes to one hour.

Ammonia not absorbed by the wood is preferably removed from the chamber, e. g. by drainage or by flushing gaseous ammonia from the chamber with air. A non-resinous, resin-forming liquid is fed into the chamber and the wood, or portions of the wood to be impregnated, are immersed therein. Although any of the non-resinous, resin-forming liquids hereinbefore mentioned may be used, a solution of one molecular equivalent of a monohydric phenol and from 1 to 2 moles of formaldehyde, which solution may be formed by admixing the phenol with an aqueous formaldehyde solution of at least 20 weight per cent concentration, is preferred.

A substantially inert gas or vapor, such as air or nitrogen, is preferably fed into the chamber to develop a pressure greater than atmospheric, e. g. of from 30 to 100 pounds per square inch gauge or higher, and thus force the liquid into the wood, but pressurizing is not required. As hereinbefore mentioned, the pretreatment of wood with ammonia facilitates ready penetration of the liquid into the wood, and adequate impregnation of wood with the resin-forming liquid can often be obtained without applying pressure, especially when the wood is a hardwood such as red oak or maple in the form of pieces of 1 inch thickness or less. The time required for impregnation with the liquid is dependent on the pressure applied, the kind and thickness of the wood, and the depth of impregnation desired. Most lumber of from ¾ to 4 inches thickness can be impregnated throughout under an applied pressure of 50–100 pounds per square inch, gauge, in less than one day and sometimes in less than one hour.

Thereafter, resin-forming liquid in excess of that absorbed by the wood is drained from the vessel and usually is neutralized. The vessel is preferably again pressurized, e. g. with air, steam or nitrogen to 50 pounds per square inch gauge pressure or higher, and the vessel and its contents are heated at temperatures in the order of from 50° to 150° C. or above, preferably from 65° to 85° C., to cause formation and hardening of a resin in the wood. Application of a vapor pressure during this heat-curing operation is not required, but reduces or prevents bleeding of a portion of the resin-forming liquid from the wood.

Such formation of a solid resin in the wood is advantageous in a number of respects. The treated wood undergoes less shrinkage or swelling with a change in humidity than does untreated wood of the same kind. The treatment hardens the wood. A particularly important advantage is that of improving the resistance of the wood against chemical attacks by acids, especially when the wood is to be used for construction of storage tanks for acidic materials or is to be used in places where it will be exposed to acids or acid vapors. The improvement against corrosive attack by acid constitutes a rough measure as to the thoroughness and uniformity of the impregnation, i. e. a poorly, or non-uniformly, impregnated board, even though it may contain a large proportion of resin, is rendered spongy or develops check marks during exposure to acid and is weakened by attack of the acid.

The following examples describe ways in which the invention has been applied and illustrate certain of its advantages, but are not to be construed as limiting its scope.

EXAMPLE 1

This example describes three experiments which were carried out for purpose of impregnating wood with a non-resinous, resin-forming liquid and thereafter heating to form a resin in the wood. One of the experiments was carried out using an impregnation method different from that of the invention. It is presented for purpose of comparison with the other experiments, both of which employed the method of the invention. The wood employed in the tests was Ponderosa pine in the form of kiln-dried, straight grained pieces, each of one inch square cross section and five inches long. The non-resinous, resin-forming liquid used in all of the experiments was a phenol-formaldehyde solution formed by dissolving 44 parts by weight of phenol in 56 parts of an aqueous 37 weight per cent formaldehyde solution. In the experiment using an impregnation method other than that of the invention, the wood was first impregnated with a saturated aqueous solution of hexamethylene tetramine and thereafter with the resin-forming liquid. The experiments carried out in accordance with the invention volved first impregnating the wood with ammonia and thereafter with the resin-forming liquid. In each experiment, the test piece of wood was weighed and placed in a chamber. Air was pumped from the chamber until the vapor pressure therein was reduced to approximately 10 inches of mercury, absolute. Thereafter, the procedures in the respective experiments were as follows.

In one of the experiments, a saturated aqueous solution of hexamethylene tetramine was introduced into the evacuated chamber in amount sufficient to completely cover the wood, thus bringing the pressure inside the chamber to atmospheric or slightly above, i. e. to about 15–20 pounds per square inch, absolute. The wood was soaked in the hexamethylene tetramine solution for 24 hours, removed from the chamber, drained free of adhering liquid, and dried in an oven at 80° C. for 24 hours. It was next completely immersed in a body of the resin-forming liquid and soaked in the liquid for 24 hours. It then was removed from the liquid, and cured by heating it at 70° C. for 24 hours in a closed chamber under an applied air pressure of 40 pounds per square inch, gauge. The treated wood was removed from the chamber, weighed, and tested as hereinafter described for resistance to attack by an aqueous hydrochloric acid solution. The wooden piece was cut across the grain thereof and the cut ends were inspected for uniformity of impregnation with the resin. All parts of the wood appeared to contain some resin, but a large part of the resin was concentrated near the outer surface of the wood as a heavy band, or shell, of about ⅛ inch depth, or thickness.

In another experiment, gaseous ammonia was introduced into the evacuated chamber containing the wood until the vapor pressure in the chamber was increased to atmospheric pressure or slightly above, i. e., to about 15–20 pounds per square inch, absolute. The wood was retained in contact with the ammonia for 24 hours. Unabsorbed ammonia was swept from the chamber with air. The ammonia-treated wood was immersed in the resin-forming liquid and was soaked in the liquid at atmospheric pressure for 24 hours. It was removed from the liquid and heated in a closed chamber at a temperature of 70° C. under an air pressure of 40 pounds per square inch, gauge, for 24 hours. It was then removed from the chamber, weighed, and tested for resistance to attack by an aqueous hydrochloric acid solution. The piece of wood was cut across the grain and the cut ends were examined for uniformity of distribution of the resin therein. The resin appeared to be evenly incorporated throughout the wood.

The third experiment was carried out in similar manner, except that the wood was retained in contact with the gaseous ammonia for only 30 minutes; the thus-treated wood was immersed in the resin-forming liquid for only 45 minutes while, however, applying an air pressure of 50 pounds per square inch, gauge, to the liquid; the excess of liquid was drained from the wood; gaseous ammonia was added to develop a vapor pressure of 5 pounds per square inch, gauge, in the chamber containing the wood; air was introduced to bring the pressure to 40 pounds per square inch, gauge; and the wood was heated at 70° C. and 40 pounds per square inch gauge pressure for 17 hours in order to form a resin in the wood and harden the resin. The wood was again weighed and was tested for resistance to attack by an aqueous hydrochloric acid solution. The piece of wood was cut across the grain and the cut ends were examined. The resin appeared to be evenly distributed throughout the wood, i. e., there was not a distinct heavy band of resin in outer portions of the wood.

The test for acid resistance, which was applied in each experiment, involves immersing the resinified wood for 2 hours in an aqueous hydrochloric acid solution of 18 weight per cent concentration while heating the solution at 70° C. The wood is then removed and examined to determine whether it has become soft and spongy, or has developed small cracks or check marks. Any such effect is indicative that the wood has been attacked by the acid in a manner which is known to weaken the wood.

The following table identifies the experiments by indicating whether hexamethylene tetramine or ammonia was first applied to the wood, the time of treating wood with such starting material to impregnate the wood therewith, the conditions of time and pressure employed in subsequently impregnating the wood with the resin-forming liquid, and the time of heating the impregnated wood at 70° C. under pressure to form a resin therein. It also gives, as the "pick up," the per cent increase in weight of each test piece resulting from the treatment. The table indicates whether each treated piece of wood was resistant to attack by acid. It also indicates whether the resin appeared to be uniformly distributed within the wood. In the table, hexamethylene tetramine is abbreviated as "hexa."

Table I

| Run No. | 1st Impregnation | | 2nd Impregnation | | Heating Time, Hrs. | Per cent Pickup in Wt. | Resin Uniformity | Acid Resistance |
|---|---|---|---|---|---|---|---|---|
| | Agent | Hrs. of Treatment | Hrs. of Treatment | Pressure, lbs./sq. in. Gauge | | | | |
| 1 | Hexa | 24 | 24 | 0 | 24 | 97.4 | Poor | Poor. |
| 2 | NH$_3$ | 24 | 24 | 0 | 24 | 42.1 | Good | Good. |
| 3 | NH$_3$ | 0.5 | 0.75 | 50 | 17 | 99.5 | Good | Good. |

EXAMPLE 2

Two pieces of Ponderosa pine wood, each one inch square and five inches long, were sealed at the ends by surface-treatment with a phenol-formaldehyde resin and hardening of the latter so as to prevent lengthwise impregnation through the grain of the wood. The pieces were individually weighed and placed in a chamber. The vapor pressure was reduced to about 250 mm. of mercury, absolute, by pumping air from the chamber. Ammonia gas was then fed into the chamber until the vapor pressure was raised to about 5 pounds per square inch, gauge. After the wood had been contacted with the ammonia for 30 minutes, unabsorbed ammonia was flushed from the chamber with air. An aqueous solution of 0.975 molecular equivalent of phenol, 0.025 mole of 2,4-dichlorophenol and 1.45 moles of formaldehyde was prepared by admixing corresponding amounts of the phenolic compounds and an aqueous formaldehyde solution of 37 weight per cent concentration. The ammonia-impregnated pieces of wood were immersed in the solution for 45 minutes while applying, to the upper surface of the solution, an air pressure of between 50 and 70 pounds per square inch, gauge. The pressure was then released and unabsorbed liquid was drained from the chamber containing the wood. Air was introduced to raise the pressure to 50 pounds per square inch, gauge. The pieces of wood were heated under said air pressure at 80° C. for 24 hours so as to form and harden a resin in the wood. Each of the thus-treated pieces of wood was again weighed. The treated wood pieces weighed 125 per cent and 139 per cent more than the respective pieces of wood had weighed prior to the treatment.

EXAMPLE 3

Test pieces of fir heart wood and of white oak were treated in accordance with the invention to form a phenol-formaldehyde resin within the wood. Each of the wood pieces was one inch square and five inches long. The procedure in impregnating the wood pieces first with ammonia and thereafter with a resin-forming liquid and in heat-curing the impregnated wood were similar to those described in Example 2, except that the resin-forming liquid was an aqueous solution of phenol and formaldehyde similar to that employed in Example 1. Each piece of wood was weighed before and after the treatment. The treatment resulted in a 46.8 per cent increase in weight of the fir heart wood and a 34.5 per cent increase in weight of the white oak.

EXAMPLE 4

This example describes a number of experiments wherein woods of several kinds were impregnated first with ammonia, and then with an aqueous solution of phenol and formaldehyde, and each piece of impregnated wood was heated to form and cure a resin within the wood. It illustrates the effects of certain changes in procedure or conditions employed in practice of the invention such as the effect of a preliminary partial evacuation of air from the wood and the effects of changes in the time of immersion of the pieces of wood in the above-mentioned aqueous solution and of changes in the temperature at which the pieces of impregnated wood were heated to form and cure a resin within the wood. For purpose of comparison, certain experiments not in accordance with the invention are also described. The experiments not in accordance with the invention employed an aqueous solution of phenol, formaldehyde and ammonia, for the impregnation of wood, instead of first impregnating the wood with ammonia and thereafter with an aqueous solution of phenol and formaldehyde. Otherwise, the steps and conditions employed in the experiments not in accordance with the invention were similar to those employed in certain of the experiments illustrating practice of the invention.

Each test block of wood was 8 inches long and of 2½ inches square cross section, with the grain running lengthwise to the block. Each wood block was weighed and placed in a chamber capable of being evacuated and provided with valved lines for the introduction and withdrawal of fluids. In certain of the experiments air was pumped from the chamber to reduce the gas pressure to about 25 mm. of mercury, absolute, and after maintaining said pressure for 15 minutes, the fluid to be used as an impregnant was fed into the chamber. In other experiments, the step of evacuating air from the chamber, and hence from the wood therein, was omitted, i. e. air in the chamber was at atmospheric pressure immediately prior to introduction of the impregnating fluid.

In each of the experiments carried out in accordance with the invention, ammonia gas was fed to the chamber containing the wood in amount such as to develop a gas pressure of from 0 to 5 pounds per square inch, gauge. This gas pressure was maintained for 45 minutes. Unabsorbed ammonia was then swept from the chamber with a current of air at approximately atmospheric pressure. An aqueous solution of phenol and formaldehyde, which had been formed by dissolving 250 grams of phenol in 500 cc. of an aqueous formaldehyde solution of 37 weight per cent concentration, was fed into the chamber so that the wood was immersed in the solution. The chamber was pressurized with air at 60 pounds per square inch gauge pressure, and this pressure was maintained for the time indicated in Table II. The pressure was next released and liquid not absorbed by the wood was drained from the chamber. The gas pressure in the chamber was raised first to 5 pounds per square inch, gauge, with gaseous ammonia and then to 60 pounds per square inch, gauge, with air. While maintaining the pressure, the chamber and its content were heated at the curing temperature indicated in Table II for 16 hours. The pressure was then released and the wood was removed from the chamber and weighed. The per cent by which the weight of a thus-treated block of wood exceeded the initial weight of the wood is reported in Table II as the "per cent pickup." Each of the treated blocks of wood was sawed in half, across the grain, and the cut ends were examined for uniformity of distribution of the resin formed in the wood. All of the wood blocks that had been treated in accordance with the invention appeared to be impregnated throughout and in a nearly uniform manner, i. e., the resin distribution was substantially even.

In each experiment which was not in accordance with the invention, an aqueous solution, formed by admixing 250 grams of phenol, 500 cc. of an aqueous 37 per cent formaldehyde solution, and 50 cc. of an aqueous ammonium hydroxide solution, was stored for four days at approximately 15.5 C., and then applied as the only impregnant for the wood. The solution was fed to a chamber containing a pre-weighed block of wood so that the latter was immersed in the liquid. Air was introduced at 60 pounds per square inch gauge pressure and this pressure was maintained for the time indicated in the table. Unabsorbed liquid was then drained from the vessel and air was again introduced at 60 pounds per square inch gauge pressure. While maintaining this pressure, the chamber and its contents were heated at 75° C. for 16 hours. The pressure was then released and the wood was weighed to determine the per cent pickup. Each treated block was cut in half across the grain and the cut ends were examined for distribution of the resin therein. Each thus-treated block had a heavy resin band or layer near the side surfaces thereof and the interior of the block appeared to contain little, if any, resin. In most instances, the resin layer in outer portions of the block appeared to be of from $\frac{1}{32}$ to $\frac{1}{16}$ inch thickness. It was somewhat thicker and less easily seen in a few instances. All of the blocks of wood treated by the method not in accord with the invention had an uneven distribution of resin therein.

The above-mentioned variations in procedure and operating conditions, and the results obtained, are summarized in Table II. In the table, phenol is abbreviated as "P" and formaldehyde as "F."

wood was retained under vacuum for about 15 minutes. Gaseous ammonia was then fed to the evacuated chamber to increase the gas pressure, in the chamber, to 5 pounds per square inch, gauge. The wood was contacted with ammonia at said pressure for 1 hour. The pressure was then released and unabsorbed ammonia was swept from the chamber with air. An aqueous solution of phenol and formaldehyde which had been formed by dissolving 1 part by weight of phenol in 1.25 parts of an aqueous 37 weight per cent formaldehyde solution, was fed into the chamber to cover the wood. Air was pumped into the chamber to develop a pressure of 60 pounds per square inch, gauge, and this pressure was maintained for 4 hours. The pressure was then released and unabsorbed liquid was drained from the chamber. Ammonia was fed to the chamber until the gas pressure in the chamber was 5 pounds per square inch, gauge. Air was fed to increase the pressure to 60 pounds per square inch, gauge. While maintaining this pressure, the chamber and its contents were heated to 75° C. for 16 hours. The pressure was then released and the test pieces of wood were removed and weighed. Table III identifies the pieces of wood by giving the per cent of heart wood in each. It gives the per cent pickup of resin for each piece of wood.

*Table III*

| Test Piece | Percent Heart Wood | Percent Pickup |
|---|---|---|
| 1 | 100 | 9.4 |
| 2 | 25 | 51.0 |
| 3 | 10 | 86.0 |

*Table II*

| Run No. | Kind of Wood | Wood First Evacuated | Impregnation With— | Curing Temp. | Results | |
|---|---|---|---|---|---|---|
| | | | | | Percent Pickup | Resin Distribution |
| 1 | Hard Maple | No | NH₃; then PF Sol'n. for 3 hrs | 75 | 48.5 | Even. |
| 2 | White Ash | No | NH₃; then PF Sol'n. for 3 hrs | 75 | 32.0 | Even. |
| 3 | White Pine | No | NH₃; then PF Sol'n. for 3 hrs | 75 | 127.0 | Even. |
| 4 | Red Oak | No | NH₃; then PF Sol'n. for 3 hrs | 75 | 22.6 | Even. |
| 5 | Hard Maple | No | Sol'n. of P, F and NH₃ 3 hrs | 75 | 20.6 | Uneven. |
| 6 | White Ash | No | Sol'n. of P, F and NH₃ 3 hrs | 75 | 9.4 | Uneven. |
| 7 | White Pine | No | Sol'n. of P, F and NH₃ 3 hrs | 75 | 16.0 | Uneven. |
| 8 | Red Oak | No | Sol'n. of P, F and NH₃ 3 hrs | 75 | 20.4 | Uneven. |
| 9 | Hard Maple | Yes | NH₃; then PF Sol'n. 90 min | 75 | 64.0 | Even. |
| 10 | Douglas Fir | Yes | NH₃; then PF Sol'n. 90 min | 75 | 15.6 | Even. |
| 11 | White Ash | Yes | NH₃; then PF Sol'n. 90 min | 75 | 14.0 | Even. |
| 12 | White Pine | Yes | NH₃; then PF Sol'n. 90 min | 75 | 67.8 | Even. |
| 13 | Red Oak | Yes | NH₃; then PF Sol'n. 90 min | 75 | 17.9 | Even. |
| 14 | Hard Maple | Yes | Sol'n. of P, F and NH₃ 90 min | 75 | 29.1 | Uneven. |
| 15 | Douglas Fir | Yes | Sol'n. of P, F and NH₃ 90 min | 75 | 6.0 | Uneven. |
| 16 | White Ash | Yes | Sol'n. of P, F and NH₃ 90 min | 75 | 3.1 | Uneven. |
| 17 | White Pine | Yes | Sol'n. of P, F and NH₃ 90 min | 75 | 17.7 | Uneven. |
| 18 | Red Oak | Yes | Sol'n. of P, F and NH₃ 90 min | 75 | 6.3 | Uneven. |
| 19 | Hard Maple | Yes | NH₃; then PF Sol'n. 90 min | 60 | 61.0 | Even. |
| 20 | Douglas Fir | Yes | NH₃; then PF Sol'n. 90 min | 60 | 11.6 | Even. |
| 21 | White Ash | Yes | NH₃; then PF Sol'n. 90 min | 60 | 45.0 | Even. |
| 22 | White Pine | Yes | NH₃; then PF Sol'n. 90 min | 60 | 144.0 | Even. |
| 23 | Red Oak | Yes | NH₃; then PF Sol'n. 90 min | 60 | 28.4 | Even. |

EXAMPLE 5

This example illustrates the treatment of yellow pine wood pieces, containing varying amounts of heart wood, in accordance with the invention. Each piece of wood was 2 feet long and of 2 inches by 4 inches rectangular cross section. One of the pieces was composed entirely of heart wood. The wood of the other two pieces was about 25 and 10 per cent by volume heart wood, respectively, the remainder being sap wood. Each piece of wood was weighed before and after the treatment. The per cent increase in weight resulting from the treatment was recorded as the per cent "pickup" of resin. The pieces of wood were placed in a chamber and air was pumped therefrom to reduce the gas pressure in the chamber to about 12.5 mm. of mercury, absolute. The

EXAMPLE 6

Air was pumped from a chamber, containing a weighed piece of Ponderosa pine having dimensions of ⅞ inch x ⅞ inch by 4 inches, to reduce the gas pressure to 250 mm. of mercury, absolute. This reduced pressure was maintained for 15 minutes. Gaseous ammonia was fed to the chamber in amount such as to increase the gas pressure to 5 pounds per square inch, gauge. This pressure was maintained for 30 minutes and then released. Gaseous ammonia, not absorbed by the wood, was swept from the chamber with air. A liquid solution consisting of one molecular equivalent of phenol and 2 molecular equivalents of furfural was charged into the chamber and the wood piece was immersed therein. Air was introduced to develop a gas pressure in the chamber of 68 pounds per square inch, gauge. This pressure was maintained for 30 minutes. The pressure was released and liquid, not absorbed by the wood, was drained from the chamber. The gas pressure in the chamber was increased to 5 pounds per square inch, gauge, by adding gaseous ammonia, after which the pressure was raised to 68 pounds per square inch, gauge, by pumping air into the chamber. The chamber and its contents were heated at 80° C. for 16 hours while maintaining the pressure last mentioned. The pressure was then released and the wood was removed and weighed to determine the amount of resin thus formed therein. The treated wood weighed 24.9 per cent more than prior to the treatment.

EXAMPLE 7

A test piece of Ponderosa pine wood having dimensions of 7/8 inch x 7/8 inch x 4 inches was placed in a chamber and air was pumped from the latter to reduce the gas pressure to approximately 50 mm. of mercury, absolute. This reduced pressure was maintained for 15 minutes. Ammonia gas was then fed to the chamber in amount such as to develop a gas pressure of 5 pounds per square inch, gauge. This pressure was maintained for 30 minutes. The pressure was then released and the excess of ammonia, over that absorbed by the wood, was swept from the chamber with air. An aqueous solution of 1 molecular equivalent of urea and 2 molecular equivalents of formaldehyde, which solution was formed by dissolving the urea in an aqueous 37 weight per cent formaldehyde solution, was introduced into the chamber and the wood was immersed in the solution. Air was introduced to raise the pressure in the chamber to 68 pounds per square inch, gauge, and this pressure was maintained for about 1 hour. The pressure was then released and the excess of liquid, over that absorbed by the wood, was drained from the chamber. The chamber was next pressurized to 5 pounds per square inch, gauge, with ammonia gas and air was pumped in to raise the pressure to 68 pounds per square inch, gauge. While maintaining this pressure, the chamber and its contents were heated at 80° C. for 16 hours to cause formation and cure of a urea-formaldehyde resin in the wood. The pressure was then released and the wood piece was removed and weighed. Its weight was 29 per cent greater than prior to the treatment, i. e. the resin pickup was approximately 29 per cent. The treated wood was of a light color similar to that of the wood alone, but was much harder than the wood alone.

EXAMPLE 8

A cylindrical graphite plug of 14 inches diameter and 10 inches length was weighed and placed in a chamber. The air pressure in the chamber was reduced to 250 mm. of mercury, absolute. A pressure of one atmosphere was re-established by feeding ammonia gas to the chamber. While maintaining the plug in the atmosphere of ammonia, an aqueous solution of phenol and formaldehyde, similar to that employed in Example 1, was fed into the chamber in amount such that the plug was immersed in the solution. Ammonia gas which had permeated into the fine pores of the graphite plug was thereby maintained inside the plug. Ammonia gas above the solution was swept from the chamber with air and the pressure was raised to from 70 to 75 pounds per square inch, gauge, with air. After the contents of the chamber had stood for 3 hours at room temperature and said pressure, liquid in excess of that absorbed by the graphite was drained from the chamber while maintaining the above-stated air pressure inside of the chamber. The pressurized chamber and its contents were next heated at 85° C. for 24 hours. The pressure was then released and the plug was removed and weighed. The pickup, i. e. the increase over the initial weight of the graphite plug, was 14 per cent. The treated plug was again subjected to the above operations and weighed. Its weight was then 25 per cent greater than the initial weight of the graphite plug.

EXAMPLE 9

Eight blocks of sandstone, each having dimensions of 3 inches x 8 inches x 10 inches, were individually weighed and thereafter were subjected to a single cycle of impregnation and resin-forming steps similar to those described in Example 8. The blocks were again weighed. The average increase in weight per block, due to the formation of a phenol-formaldehyde resin therein, was 12.6 pounds per cubic foot of the sandstone.

EXAMPLE 10

Twelve pieces of Ponderosa pine, each of known weight and having dimensions of 7/8 inch x 7/8 inch x 5 inches, were placed in a chamber. Air was pumped from the chamber to reduce the pressure to about 25 mm., absolute. This reduced pressure was maintained for 15 minutes. Vapors formed by boiling an aqueous 25 weight per cent methylamine solution were then fed to the chamber to develop a vapor pressure of approximately 1 atmosphere inside the chamber. The wood was maintained in contact with the methylamine vapors at atmospheric pressure for 15 minutes. Methylamine, in excess of that absorbed by the wood, was flushed from the chamber with air. An aqueous solution of 1 molecular equivalent of phenol and 1.45 moles of formaldehyde, which solution was formed by dissolving the phenol in an aqueous formaldehyde solution of 37 weight per cent concentration, was added to cover the wood. An air pressure of 68 pounds per square inch gauge, was applied to the contents of the chamber for 1 hour. The pressure was then released and liquid, in excess of that absorbed by the wood, was drained from the chamber. Air was then swept from the chamber with a current of methylamine vapors which were produced as described above and were at approximately atmospheric pressure. While retaining methylamine vapor in the chamber, air was introduced to develop a gas pressure of 68 pounds per square inch gauge. This pressure was maintained and the chamber and its contents were heated to 80° C. for 20 hours. The pressure was released and the pieces of wood were removed and weighed to determine the amount of resin formed therein. The average increase in weight of the wood pieces, due to the treatment, was 55 per cent.

EXAMPLE 11

In a manufacturing process, tubs, 12 feet in diameter and of 4 feet depth, are used as storage vats for an acidic aqueous iron chloride solution, which solution contains approximately 30 per cent by weight of iron chloride (a mixture of ferrous and ferric chlorides) and from 6 to 8 per cent of hydrochloric acid and is maintained at a temperature of 80° C. The sides of the tubs are constructed of Ponderosa pine wood staves having dimensions of 4 inches x 6 inches x 4 feet. The solution is corrosive to the wood and gradually renders it soft, punky, and weak. Periodically, the tubs are tested by prodding them on the inside with a pointed steel rod to determine whether they are suitable for further use. The tubs usually have a service life of from 10 to 12 months, at the end of which time they are weakened to an extent rendering them unsafe and are discarded. The staves for construction of such a tub were treated in a manner similar to that described in Example 2, except that the liquid impregnant was an aqueous solution of phenol and formaldehyde, similar to that employed in Example 1, and a phenol-formaldehyde resin was formed within each stave. The staves were weighed before and after the treatment. The average increase in weight of the staves, resulting from the treatment, was 6.05 pounds per cubic foot of wood. The treated, i. e. resinated, staves were used in constructing a tub of the above-mentioned size and the tub was placed in service. After 12 months of service as a storage vat for the heated iron chloride solution, the tub was not corroded to an appreciable extent, i. e. it appeared to be as strong and in as good condition as when first placed in service.

EXAMPLE 12

In another chemical manufacturing process, exhaust fans provided with wooden propellers are used to withdraw acidic fumes, i. e. air heavily laden with hydrogen chloride and metal chlorides, from a room. Each propeller has an overall length of 8 feet 4 inches and a maximum width of 6 inches. The propellers are constructed of oak, except for the tips which are hard maple and, in some instances, are patched with birch. The propellers are quite rapidly corroded by the acidic fumes and small pieces thereof break away from time to time and are thrown from the fan. The usual service life of a propeller is about 10 weeks. A new propeller of white oak, and having hard maple tips, was weighed and treated to form a phenol-formaldehyde resin within the wood by procedure similar to that employed in Example 11. The thus-resinified propeller was weighed. The increase in weight, due to the resinification treatment, was 1.5 pounds per cubic foot of wood. The treated propeller was placed in service for 20 weeks 5 days and was then dismounted and examined. It was not damaged, or corroded, appreciably. It weighed approximately 18 per cent more than when first placed in service and, on standing, exuded a liquid. A portion of this liquid was analyzed and found to be an aqueous hydrochloric acid solution containing minor amounts of ferric chloride and magnesium chloride. The resin which had been formed in the wood apparently protected the wood against damage by the absorbed acid.

We claim:

1. A method of resinifying a solid porous body which comprises contacting said body with a normally gaseous basic nitrogen compound of the group consisting of ammonia and amines to cause permeation of the normally gaseous basic nitrogen compound into the solid porous body, impregnating the solid porous body, containing the basic nitrogen compound, with a non-resinous liquid comprising an aldehyde and an organic compound condensible therewith, which liquid is capable of undergoing a condensation reaction in the presence of the basic nitrogen compound to form a solid resin, and maintaining the impregnated solid porous body at a reaction temperature until a resin is formed therein.

2. A method of resinifying a solid porous cellulosic body which comprises impregnating the cellulosic body with a normally gaseous basic nitrogen compound of the group consisting of ammonia and amines, impregnating the thus-treated cellulosic body with a non-resinous liquid comprising an aldehyde and an organic compound condensible therewith, which liquid is capable of undergoing a condensation reaction under the action of heat and the basic nitrogen compound as a condensation catalyst to form a solid resin, and heating the impregnated cellulosic body to form a resin therein.

3. A method of resinifying wood which comprises impregnating the wood with gaseous ammonia, removing the ammonia, in excess of that absorbed by the wood, from contact with the latter, impregnating the wood, having ammonia absorbed therein, with a non-resinous liquid comprising an aldehyde and an organic compound condensible therewith, which liquid is capable of undergoing a condensation reaction under the action of heat and the ammonia as a catalyst to form a solid resin, removing unabsorbed liquid out of contact with the impregnated wood, and heating the latter to form a resin therein.

4. A method, as claimed in claim 3, wherein the wood impregnated with ammonia and the non-resinous, resin-forming liquid is heated in contact with a substantially inert gas at superatmospheric pressure to cause formation of a resin within the wood.

5. A method, as claimed in claim 4, wherein the non-resinous, resin-forming liquid is a solution of phenol and formaldehyde.

6. A method, as claimed in claim 4, wherein the non-resinous, resin-forming liquid is a solution of phenol and furfuraldehyde.

7. A method, as claimed in claim 4, wherein the non-resinous, resin-forming liquid is a solution of urea and formaldehyde.

8. A method of resinifying wood which comprises evacuating air from the wood, then contacting and impregnating the wood with gaseous ammonia at a pressure at least as high as atmospheric pressure, displacing the surrounding atmosphere of unabsorbed ammonia gas with air, immersing the ammonia-impregnated wood in a non-resinous liquid comprising an aldehyde and an organic compound condensible therewith, which liquid is capable of reacting under the action of heat and the ammonia as a catalyst to form a solid resin, impregnating the wood with the liquid, removing unabsorbed liquid from contact with the impregnated wood, and heating the latter at temperatures between 50° and 150° C. in contact with a substantially non-reactive gas at superatmospheric pressure to form a resin within the wood.

9. A method, as claimed in claim 8, wherein the non-resinous, resin-forming liquid is a solution of phenol and formaldehyde.

10. A method, as claimed in claim 8, wherein the non-resinous, resin-forming liquid is a solution of phenol and furfuraldehyde.

11. A method, as claimed in claim 8, wherein the non-resinous, resin-forming liquid is a solution of urea and formaldehyde.

12. A method, as claimed in claim 8, wherein the ammonia-impregnated wood is further impregnated with the non-resinous, resin-forming liquid at super-atmospheric pressure.

13. A method, as claimed in claim 12, wherein the non-resinous, resin-forming liquid is a solution of phenol and formaldehyde.

References Cited in the file of this patent

UNITED STATES PATENTS

| 954,666 | Baekeland | Apr. 12, 1910 |
| 2,020,172 | Cotchett | Nov. 5, 1935 |
| 2,210,832 | Bright | Aug. 6, 1940 |